(12) United States Patent
Sonoda et al.

(10) Patent No.: US 6,778,298 B1
(45) Date of Patent: Aug. 17, 2004

(54) IMAGE FORMING APPARATUS

(75) Inventors: Yasuko Sonoda, Shizuoka (JP); Osamu Shimizu, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 837 days.

(21) Appl. No.: 09/662,639

(22) Filed: Sep. 15, 2000

(30) Foreign Application Priority Data

Sep. 16, 1999 (JP) ........................................ P. 11-262105

(51) Int. Cl.⁷ ................................................. H04N 1/40
(52) U.S. Cl. ...................... 358/3.01; 358/1.9; 358/3.13; 358/3.26; 358/536; 347/131
(58) Field of Search ................................ 358/3.01, 1.9, 358/1.1, 3.02, 3.09, 3.06, 3.07, 3.1, 3.11, 3.12, 3.2, 3.21, 3.3, 3.22, 3.23, 3.26, 296, 534, 535, 503, 504, 505, 536; 382/270–273, 260–265; 347/171–223, 15, 131, 240, 251–254; 399/180–181

(56) References Cited

U.S. PATENT DOCUMENTS

| 5,124,803 A | * | 6/1992 | Troxel ........................ 358/3.26 |
| 5,602,971 A | * | 2/1997 | Deschuytere ................ 358/1.9 |
| 5,903,713 A | * | 5/1999 | Daels et al. .................. 358/1.9 |
| 6,101,002 A | * | 8/2000 | Urasawa ..................... 358/3.13 |
| 6,133,927 A | * | 10/2000 | Arai et al. ................... 347/131 |
| 6,141,121 A | * | 10/2000 | Chen et al. .................. 358/534 |

FOREIGN PATENT DOCUMENTS

JP          10-191058          7/1998          ............ H04N/1/40

* cited by examiner

Primary Examiner—Kimberly Williams
Assistant Examiner—Melanie Vida
(74) Attorney, Agent, or Firm—Sughrue Mion, PLLC

(57) ABSTRACT

There is provided an image forming apparatus that enables the formation of high-quality multi-level images by ensuring that the size of blocks into which the image is to be divided is specified in accordance with the resolution of the image to be recorded. The apparatus divides input image gradation level data into a plurality of blocks and performs graduated recording by converting the divided image gradation level data into multi-level recording data in accordance with gradation conversion characteristics determined as keyed to relative positions in each of the blocks; the blocks are typically set to a size satisfying the following relation:

$(55/n) < X/p < (65/n)$, provided $p$ is an integral multiple of 10;

where X is the resolution of the image to be recorded in a given direction and expressed in dpi, p is the length of each block in said given direction and expressed in dots, and n is a natural number.

12 Claims, 20 Drawing Sheets

| | RESOLUTION X [ dpi ] | LENGTH p [ DOTS ] | n | X/p |
|---|---|---|---|---|
| MAIN SCANNING DIRECTION | 600 | 20 | 2 | 30 |
| SUB-SCANNING DIRECTION | 1200 | 40 | 2 | 30 |

FIG. 3

| 8 BITS | 10 BITS | 8 BITS | 10 BITS | 8 BITS | 10 BITS | 8 BITS | 10 BITS | 8 BITS | 10 BITS |
|---|---|---|---|---|---|---|---|---|---|
| 0 | 0 | 51 | 206 | 102 | 412 | 153 | 617 | 204 | 823 |
| 1 | 4 | 52 | 210 | 103 | 416 | 154 | 621 | 205 | 827 |
| 2 | 8 | 53 | 214 | 104 | 420 | 155 | 626 | 206 | 831 |
| 3 | 12 | 54 | 218 | 105 | 424 | 156 | 630 | 207 | 835 |
| 4 | 16 | 55 | 222 | 106 | 428 | 157 | 634 | 208 | 839 |
| 5 | 20 | 56 | 226 | 107 | 432 | 158 | 638 | 209 | 843 |
| 6 | 24 | 57 | 230 | 108 | 436 | 159 | 642 | 210 | 847 |
| 7 | 28 | 58 | 234 | 109 | 440 | 160 | 646 | 211 | 852 |
| 8 | 32 | 59 | 238 | 110 | 444 | 161 | 650 | 212 | 856 |
| 9 | 36 | 60 | 242 | 111 | 448 | 162 | 654 | 213 | 860 |
| 10 | 40 | 61 | 246 | 112 | 452 | 163 | 658 | 214 | 864 |
| 11 | 44 | 62 | 250 | 113 | 456 | 164 | 662 | 215 | 868 |
| 12 | 48 | 63 | 254 | 114 | 460 | 165 | 666 | 216 | 872 |
| 13 | 52 | 64 | 258 | 115 | 464 | 166 | 670 | 217 | 876 |
| 14 | 56 | 65 | 262 | 116 | 468 | 167 | 674 | 218 | 880 |
| 15 | 61 | 66 | 266 | 117 | 472 | 168 | 678 | 219 | 884 |
| 16 | 65 | 67 | 270 | 118 | 476 | 169 | 682 | 220 | 888 |
| 17 | 69 | 68 | 274 | 119 | 480 | 170 | 686 | 221 | 892 |
| 18 | 73 | 69 | 278 | 120 | 484 | 171 | 690 | 222 | 896 |
| 19 | 77 | 70 | 282 | 121 | 488 | 172 | 694 | 223 | 900 |
| 20 | 81 | 71 | 287 | 122 | 492 | 173 | 698 | 224 | 904 |
| 21 | 85 | 72 | 291 | 123 | 496 | 174 | 702 | 225 | 908 |
| 22 | 89 | 73 | 295 | 124 | 500 | 175 | 706 | 226 | 912 |
| 23 | 93 | 74 | 299 | 125 | 504 | 176 | 710 | 227 | 916 |
| 24 | 97 | 75 | 303 | 126 | 508 | 177 | 714 | 228 | 920 |
| 25 | 101 | 76 | 307 | 127 | 513 | 178 | 718 | 229 | 924 |
| 26 | 105 | 77 | 311 | 128 | 517 | 179 | 722 | 230 | 928 |
| 27 | 109 | 78 | 315 | 129 | 521 | 180 | 726 | 231 | 932 |
| 28 | 113 | 79 | 319 | 130 | 525 | 181 | 730 | 232 | 936 |
| 29 | 117 | 80 | 323 | 131 | 529 | 182 | 734 | 233 | 940 |
| 30 | 121 | 81 | 327 | 132 | 533 | 183 | 739 | 234 | 944 |
| 31 | 125 | 82 | 331 | 133 | 537 | 184 | 743 | 235 | 948 |
| 32 | 129 | 83 | 335 | 134 | 541 | 185 | 747 | 236 | 952 |
| 33 | 133 | 84 | 339 | 135 | 545 | 186 | 751 | 237 | 956 |
| 34 | 137 | 85 | 343 | 136 | 549 | 187 | 755 | 238 | 960 |
| 35 | 141 | 86 | 347 | 137 | 553 | 188 | 759 | 239 | 965 |
| 36 | 145 | 87 | 351 | 138 | 557 | 189 | 763 | 240 | 969 |
| 37 | 149 | 88 | 355 | 139 | 561 | 190 | 767 | 241 | 973 |
| 38 | 153 | 89 | 359 | 140 | 565 | 191 | 771 | 242 | 977 |
| 39 | 157 | 90 | 363 | 141 | 569 | 192 | 775 | 243 | 981 |
| 40 | 161 | 91 | 367 | 142 | 573 | 193 | 779 | 244 | 985 |
| 41 | 165 | 92 | 371 | 143 | 577 | 194 | 783 | 245 | 989 |
| 42 | 169 | 93 | 375 | 144 | 581 | 195 | 787 | 246 | 993 |
| 43 | 174 | 94 | 379 | 145 | 585 | 196 | 791 | 247 | 997 |
| 44 | 178 | 95 | 383 | 146 | 589 | 197 | 795 | 248 | 1001 |
| 45 | 182 | 96 | 387 | 147 | 593 | 198 | 799 | 249 | 1005 |
| 46 | 186 | 97 | 391 | 148 | 597 | 199 | 803 | 250 | 1009 |
| 47 | 190 | 98 | 395 | 149 | 601 | 200 | 807 | 251 | 1013 |
| 48 | 194 | 99 | 400 | 150 | 605 | 201 | 811 | 252 | 1017 |
| 49 | 198 | 100 | 404 | 151 | 609 | 202 | 815 | 253 | 1021 |
| 50 | 202 | 101 | 408 | 152 | 613 | 203 | 819 | 254 | 1022 |
| | | | | | | | | 255 | 1023 |

FIG. 11
M-COLOR
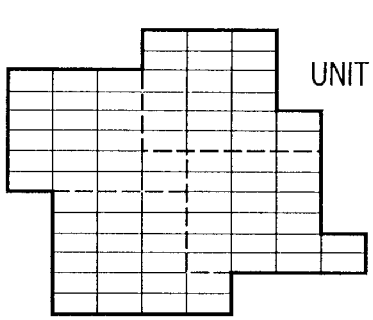
UNIT BLOCK (20 x 40 DOTS)   UNIT   SUB-UNIT

SCREEN ANGLE ABOUT 45°

SCREEN ANGLE ABOUT 75°

SCREEN ANGLE ABOUT 15°

SCREEN ANGLE ABOUT 30°

|  | RESOLUTION X [ dpi ] | LENGTH p [ DOTS ] | n | X/p |
|---|---|---|---|---|
| MAIN SCANNING DIRECTION | 600 | 20 | 2 | 30 |
| SUB-SCANNING DIRECTION | 1200 | 40 | 2 | 30 |

|  | RESOLUTION X [ dpi ] | LENGTH p [ DOTS ] | n | X/p |
|---|---|---|---|---|
| MAIN SCANNING DIRECTION | 600 | 15 | 1 | 40 |
| SUB-SCANNING DIRECTION | 1200 | 15 | 1 | 80 |

FIG. 22
SCREEN ANGLE 0°
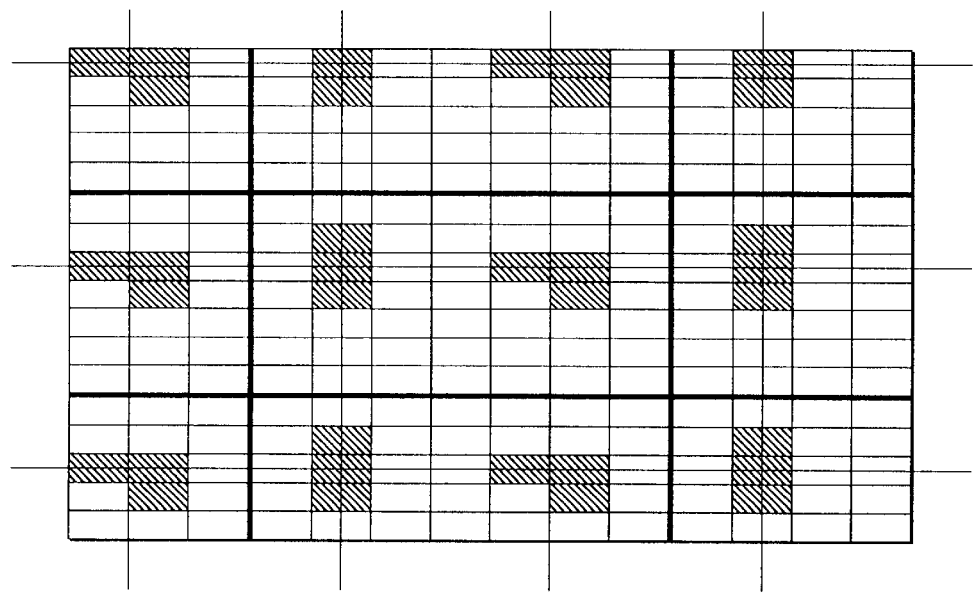
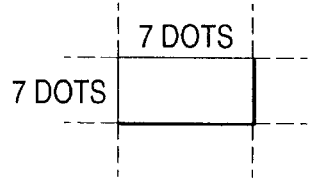
FIG. 23
| | RESOLUTION X [dpi] | LENGTH p [DOTS] | n | X/p |
|---|---|---|---|---|
| MAIN SCANNING DIRECTION | 600 | 7 | 1 | 85.7 |
| SUB-SCANNING DIRECTION | 1200 | 7 | 1 | 171.4 |

IMAGE FORMING APPARATUS

BACKGROUND OF THE INVENTION

1. Field of the Invention

This invention relates to an image forming apparatus for recording high-quality graduated images. More particularly, the invention relates to a technique of dividing an input picture into a plurality of blocks and converting its gradation with the size of the blocks so specified that desired screen angles can be achieved in a correct and easy way.

2. Description of the Related Art

Known in the art of multi-color imagery is a method in which data that represents the gradation levels for each of the colors the image is to be recorded in and which are input to an image forming apparatus is divided into blocks each consisting of predetermined regions and the gradation levels of individual pixels are converted within each block on the basis of a transformation matrix having tone conversion characteristics set in correspondence with the position in the block so as to accomplish graduated recording.

If the same transformation matrix is applied to all of the colors in which the image is to be recorded, image deterioration occurs as exemplified by moirés due to interference between recording colors or the clogging up of colors that are placed in the same position. To avoid these problems, multi-color images are recorded using transformation matrices that have different screen angles for the respective recording colors.

However, the transformation matrices having different angles for different colors are not necessarily square in shape and it is often required to set matrices of complex shapes. With a square matrix, blocks into which the data for image's gradation levels are to be divided need be simply tiled; on the other hand, the transformation matrices having different screen angles for different colors have to be set as those of special shapes so that they have a two-dimensional periodicity and can form the desired screen angles. This setting process requires not only high skill but also a great number of steps to be performed.

SUMMARY OF THE INVENTION

The present invention has been accomplished under these circumstances and has as an object providing an image forming apparatus that enables the formation of high-quality multi-level images by ensuring that the size of blocks into which the image is to be divided is specified in accordance with the resolution of the image to be recorded.

The stated object of the invention can be attained by the image forming apparatus, which divides input image gradation level data into a plurality of blocks and which performs graduated recording by converting said divided image gradation level data into multi-level recording data in accordance with gradation conversion characteristics determined as keyed to relative positions in each of said blocks, characterized in that said blocks are set to a size satisfying the following relation:

$(55/n) < X/p < (65/n)$, provided $p$ is an integral multiple of 10;

where X is the resolution of the image to be recorded in a given direction and expressed in dpi, p is the length of each block in said given direction and expressed in dots, and n is a natural number.

In this image forming apparatus, the image gradation level data divided into a plurality of blocks is converted to multi-level recording data in accordance with gradation conversion characteristics keyed to relative positions in each block so as to perform graduated recording, with the blocks being set to a size satisfying the relation of $(55/n)<X/p<(65/n)$, provided p is an integral multiple of 10. As a result, blocks that provide a screen angle of about 15 or 75 degrees at any resolution of the image to be recorded can be tiled seamlessly in an ordered pattern throughout the image so as to form a high-quality multi-level image with less visible graininess without deterioration in the resolution of the multi-color image.

The stated object of the invention can be also also attained by the image forming apparatus, which divides input image gradation level data into a plurality of blocks and which performs graduated recording by converting said divided image gradation level data into multi-level recording data in accordance with gradation conversion characteristics determined as keyed to relative positions in each of said blocks, characterized in that said blocks are set to a size satisfying the following relation:

$(110/n) < X/p < (130/n)$, provided $p$ is an integral multiple of 5;

where X is the resolution of the image to be recorded in a given direction and expressed in dpi, p is the length of each block in said given direction and expressed in dots, and n is a natural number.

In this image forming apparatus, the image gradation level data divided into a plurality of blocks is converted to multi-level recording data in accordance with gradation conversion characteristics keyed to relative positions in each block so as to perform graduated recording, with the blocks being set to a size satisfying the relation of $(110/n)<X/p<(130/n)$, provided p is an integral multiple of 5. As a result, blocks that provide a screen angle of about 45 degrees at any resolution of the image to be recorded can be tiled seamlessly in an ordered pattern throughout the image so as to form a high-quality multi-level image with less visible graininess without deterioration in the resolution of the multi-color image.

The stated object of the invention can be also attained by the image forming apparatus, which divides input image gradation level data into a plurality of blocks and which performs graduated recording by converting said divided image gradation level data into multi-level recording data in accordance with gradation conversion characteristics determined as keyed to relative positions in each of said blocks, characterized in that said blocks are set to a size satisfying the following relations:

$(36/n) < X_1/p_1 < (44/n)$ and $(72/n) < X_2/p_2 < (88/n)$, provided $p_1$ and $p_2$ are each an integral multiple of 15;

where $X_1$ is the resolution of the image to be recorded in a given direction and expressed in dpi, $p_1$ is the length of each block in said given direction and expressed in dots, $X_2$ is the resolution of the image to be recorded in a direction generally perpendicular to said given direction and expressed in dpi, $p_2$ is the length of each block in said perpendicular direction and expressed in dots, and n is a natural number.

In this image forming apparatus, the image gradation level data divided into a plurality of blocks is converted to multi-level recording data in accordance with gradation conversion characteristics keyed to relative positions in each block so as to perform graduated recording, with the blocks being set to a size satisfying both the relation of $(36/n)<X_1/p_1<(44/n)$ for a given direction and the relation of $(72/n)<X_2/p_2<(88/n)$ for a direction generally perpendicular to said given direction, provided $p_1$ and $p_2$ are each an integral multiple of 15. As a result, blocks that provide a screen angle of about 30 degrees at any resolution of the image to be recorded can be tiled seamlessly in an ordered pattern throughout the image so as to form a high-quality multi-level image with less visible graininess without deterioration in the resolution of the multi-color image.

The stated object of the invention can be also attained by the image forming apparatus, which divides input image gradation level data into a plurality of blocks and which performs graduated recording by converting said divided image gradation level data into multi-level recording data in accordance with gradation conversion characteristics determined as keyed to relative positions in each of said blocks, characterized in that said blocks are set to a size satisfying the following relations:

$$(77/n)<X_1/p_1<(94/n)$$

and $$(154/n)<X_2/p_2<(189/n), \text{ provided } p_1 \text{ and } p_2 \text{ are each an integral multiple of 7;}$$

where $X_1$ is the resolution of the image to be recorded in a given direction and expressed in dpi, $p_1$ is the length of each block in said given direction and expressed in dots, $X_2$ is the resolution of the image to be recorded in a direction generally perpendicular to said given direction and expressed in dpi, $p_2$ is the length of each block in said perpendicular direction and expressed in dots, and n is a natural number.

In this image forming apparatus, the image gradation level data divided into a plurality of blocks is converted to multi-level recording data in accordance with gradation conversion characteristics keyed to relative positions in each block so as to perform graduated recording, with the blocks being set to a size satisfying both the relation of $(77/n)<X_1/p_1<(94/n)$ for a given direction and the relation of $(154/n)<X_2/p_2<(189/n)$ for a direction generally perpendicular to said given direction, provided $p_1$ and $p_2$ are each an integral multiple of 7. As a result, blocks that provide a screen angle of about zero degrees at any resolution of the image to be recorded can be tiled seamlessly in an ordered pattern throughout the image so as to form a high-quality multi-level image with less visible graininess without deterioration in the resolution of the multi-color image.

The image forming apparatus in this invention may be modified such that the blocks correspond to the respective colors in which a multi-color image is to be recorded.

In this image forming apparatus, the blocks are adapted to correspond to the respective colors such as K, C, M and Y in which a multi-color image is to be recorded. As a result, the screen angle can be set to a desired value for each color as selected from among about 15, 30, 45 and 75 degrees, thereby forming a high-quality multi-color image while preventing the clogging up of colors.

The image forming apparatus in this invention may be also modified such that the blocks correspond to the respective colors in which a multi-color image is to be recorded.

In this image forming apparatus, the blocks are adapted to correspond to the respective colors such as K, C, M and Y in which a multi-color image is to be recorded. As a result, the screen angle can be set to a desired value for each color as selected from among about 0, 15, 45 and 75 degrees, thereby forming a high-quality multi-color image while preventing the clogging up of colors.

The image forming apparatus in this invention may be modified such that the blocks are dedicated to recording in cyan and magenta, the blocks to recording in black, and the blocks to recording in yellow.

In this image forming apparatus, the screen angle of the blocks for recording in cyan and magenta is set to either about 15 degrees or about 75 degrees, that of the blocks for recording in black is set to about 45 degrees, and that of the blocks for recording in yellow is set to about 30 degrees, eventually contributing to the formation of a high-quality multi-color image.

The image forming apparatus according to—one of embodiments of this invention may be modified such that a recording head for performing said graduated recording is a thermal head.

In this image forming apparatus, the use of a thermal head as the recording head allows the gradation converted data to be output as energy to be applied to the thermal head so that said data can provide a high-quality graduated record.

The image forming apparatus according to—one of embodiments of this invention may be modified such that it uses a heat-sensitive transfer recording material that has a substantially clear heat-sensitive ink layer in a thickness of from 0.2 $\mu$m to 1.0 $\mu$m and containing 30–70 parts by weight of a pigment and 25–60 parts by weight of an amorphous organic high-molecular weight polymer having a softening point of 40° C.–150° C., at least 70% of the pigment in said heat-sensitive ink layer having a particle size of no more than 1.0 $\mu$m, and the transfer image having an optical reflection density of at least 1.0 on a white base.

Having the constituent materials of the heat-sensitive transfer recording material specified as above, the image forming apparatus according to claim 12 can produce graduated records of very high quality that are very much like printed matter in terms of color reproduction and texture.

BRIEF DESCRIPTION OF THE DRAWINGS

FIG. 3 is an exemplary table for converting gradation levels from 8 bits to 10 bits;

FIG. 11 is a unit block, a "unit" and a subunit for an M transformation matrix (to give a screen angle of about 15 degrees);

FIG. 22 is an illustration explaining how a pattern of Y recording dots are formed (to give a screen angle of zero degrees); and FIG. 23 is an illustration of the conditions that should be satisfied by the size of a unit block in order to provide a screen angle of zero degrees.

DESCRIPTION OF THE PREFERRED EMBODIMENTS

Figure 1:
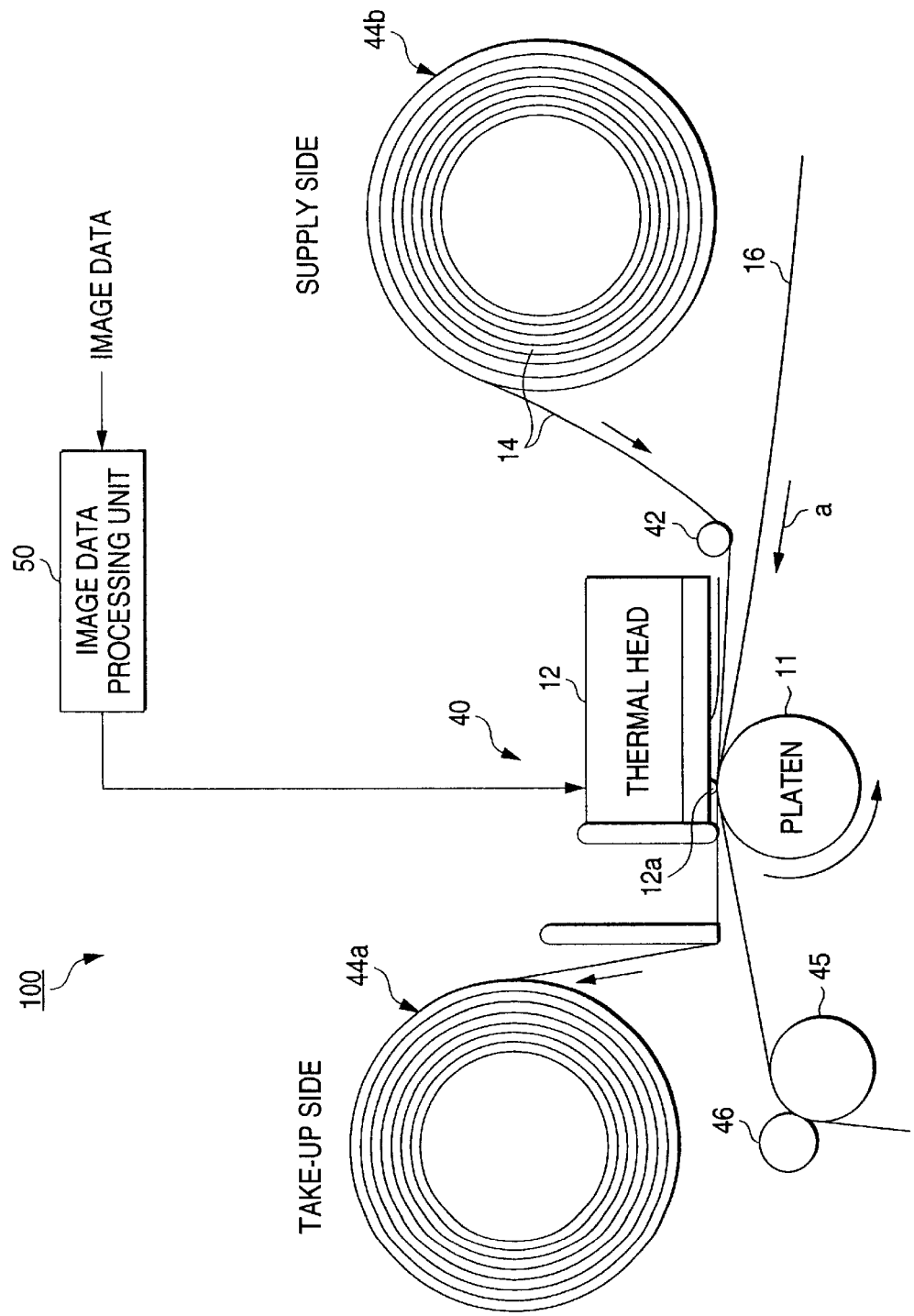
FIG. 1 is a detail of the recording unit in the image forming apparatus of the invention.

Various modes for carrying out the invention are described below in detail with reference to the accompanying drawings. First, FIG. 1 shows the construction of a recording unit 40 in an image forming apparatus 100 which is an embodiment of the invention. As shown, a cylindrical platen 11 positioned vis-à-vis a thermal head 12 rotates, typically counterclockwise, to transfer a receiver sheet 16 while, at the same time, it applies a predetermined pressure towards the thermal head 12 so that it presses the receiver sheet 16 and an ink ribbon 14 as the latter is taken up by a take-up roll 44a via a guide roller 42.

The thermal head 12 has heat generating resistors that allow the image to be thermally transferred onto the receiver sheet 16 via the ink ribbon 14 as it is driven to move by a pair of rolls 45 and 46 past the platen 11.

The thermal head 12 records an image at a pixel density of about 600 dpi (dots per inch), occasionally at 300, 800, 1200 or 2400 dpi, and it has the heat generating resistors arranged in a row (normal to the paper of FIG. 1) to record a line of image on the receiver sheet 16.

While retaining the receiver sheet 16 in a predetermined position, the platen 11 rotates at a predetermined image transfer speed so as to transfer the receiver sheet 16 in a direction (indicated by arrow a in FIG. 1) that is substantially perpendicular to the direction in which a glaze 12a extends on the thermal head 12.

The recording unit 40 records the image by the following procedure. First, the receiver sheet 16 is transferred such that a predetermined transfer start position comes into a face-to-face relationship with the glaze 12a. Then, as it is kept in registry with the ink ribbon 14 (in each of K, C, M and Y colors to produce a full-color image), the receiver sheet 16 is transferred by the platen 11 to move in the direction of arrow a.

As the result of this transfer, the heat generating resistors in the glaze 12a are energized in accordance with the image data for the picture to be recorded, thereby effecting transfer recording on the receiver sheet 16 so that an image corresponding to the picture to be recorded is transferred onto the receiver sheet 16. In the case of a full-color image, monochromatic images are transferred in superposition onto the receiver sheet 16, typically in the order of K, C, M and Y.

The thermal head 12 is supplied with image data from a computer or another image data output apparatus via an image data processing unit 50.

Figure 2:
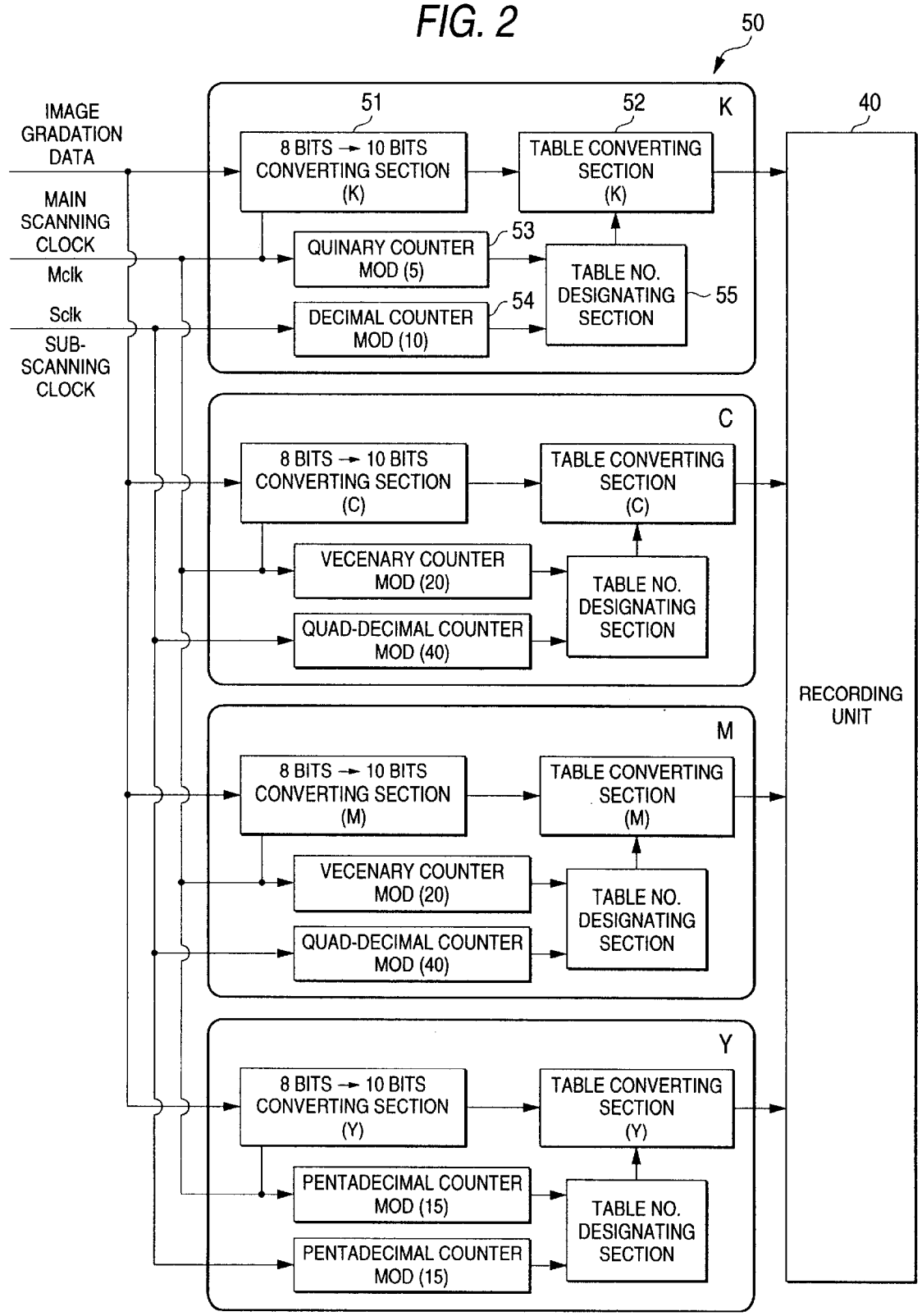
FIG. 2 is a block diagram for signal processing as the procedure of processing image data by the image data processing unit.

The supplied image data is processed with the image data processing unit 50 by the procedure described below with reference to the block diagram for signal processing that is shown in FIG. 2. The procedure of data processing shown in FIG. 2 consists of gradation conversion and other schemes that are performed on the image data input to the image processing unit 50 so that it is output to the recording unit 40.

In the embodiment under consideration, the image gradation level data to be input to the image data processing unit 50 shown in FIG. 2 is image data of a 8-bit gradation (in 256 gradations) having a resolution of 600 dpi, provided that the resolution in a sub-scan direction has been converted to 1200 dpi. Conversion to 1200 dpi can be accomplished by most neighboring interpolation, linear interpolation or the combination of these two techniques, as proposed by one of the inventors of the present invention and described in Unexamined Published Japanese Patent Application (kokai) No. 191058/1998.

The image gradation level image having a resolution of 600 dpi in the main scan direction and a resolution of 1200 dpi in the sub-scan direction has the gradation levels converted in the processing sections provided for respective colors K, C, M and Y and the processed image data are sequentially output to the recording unit 40.

Take K color as an example. The image gradation level data of 8-bit gradation (in 256 gradations) is first input to an 8-bit→10-bit converting section 51, where it has the gradation levels converted from 8 bits to 10 bits (in 1024 gradations). An example of the table for effecting this conversion is shown in FIG. 3. While the 8-bit→10-bit conversion is mostly performed in accordance with the conversion table shown in FIG. 3, the conversion values are altered from one position to another in the image to be recorded in the main scan direction as appropriate for various parameters including the characteristics of a specific recording head device, the pressure distribution on the head and the characteristics of the recording material.

In the next step, the image gradation level data that has been converted to 10-bit gradation is input to a table converting section 52. In the table converting section 52, tables (characteristic curves) each showing the relationship between the energy to be applied to the recording head for generating recording dots and the gradation level are preliminarily set and the gradation levels of the input image gradation level data are converted to the values of energy to be applied on the basis of those characteristic curves. In the embodiment under consideration, the value of energy to be applied corresponds to the width of a pulse to be applied to the recording head.

Figure 4:
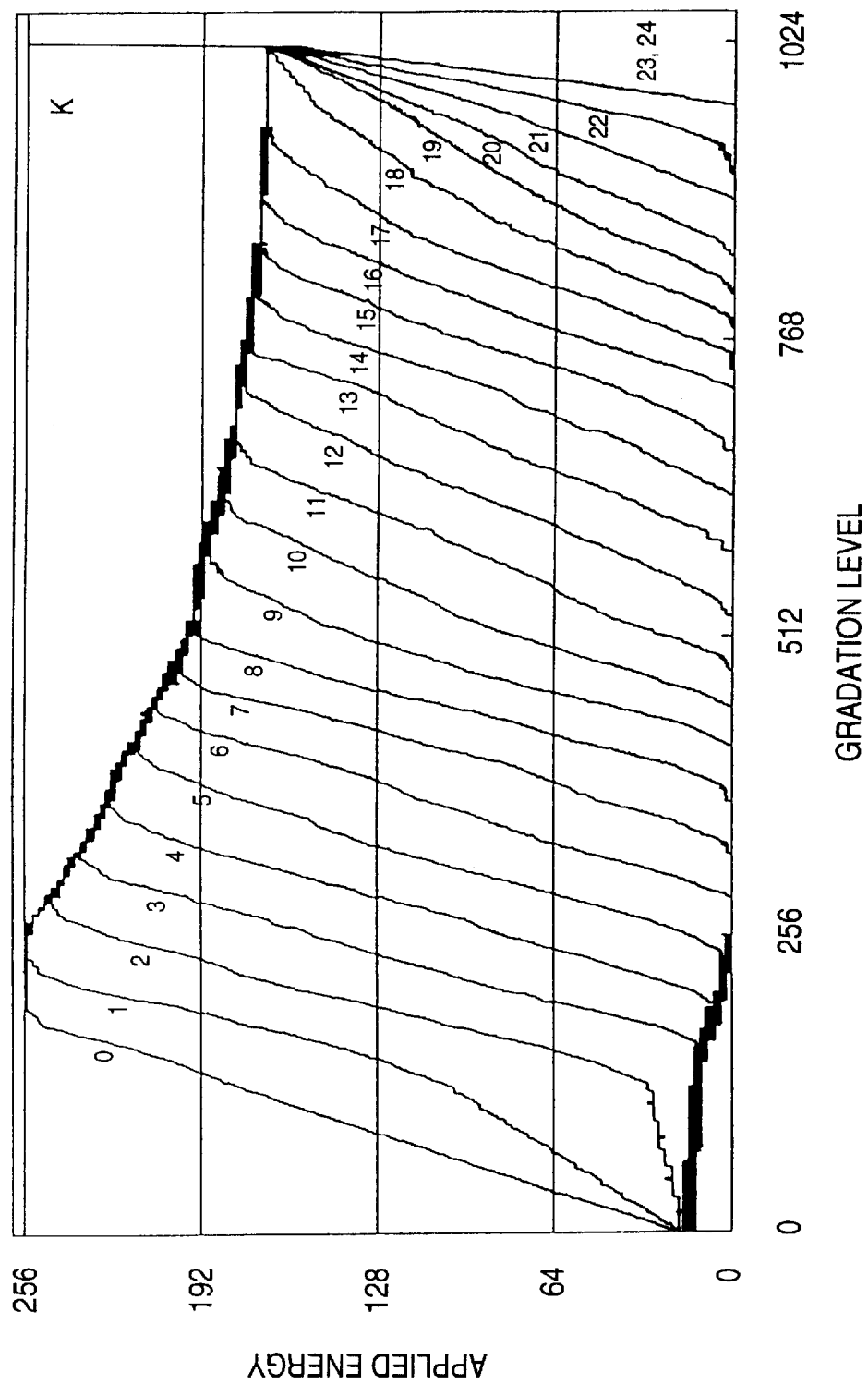
FIG. 4 is a set of characteristic curves for use with a K gradation conversion table that represent the relationship between the gradation level and the amount of energy to be applied to the recording head.

FIG. 4 shows the K color gradation conversion characteristics serving as the basis for the conversion table. The horizontal axis of FIG. 4 plots the gradation levels of the image data converted to 10-bit gradation and the vertical axis plots the energy to be applied to the recording head which corresponds to the size of recording dots. The gradation conversion characteristics shown in Table 4 have a total of 25 settings (0–24) for the characteristic curves mentioned above which respectively define the degree of growth of recording dots.

Figure 5:
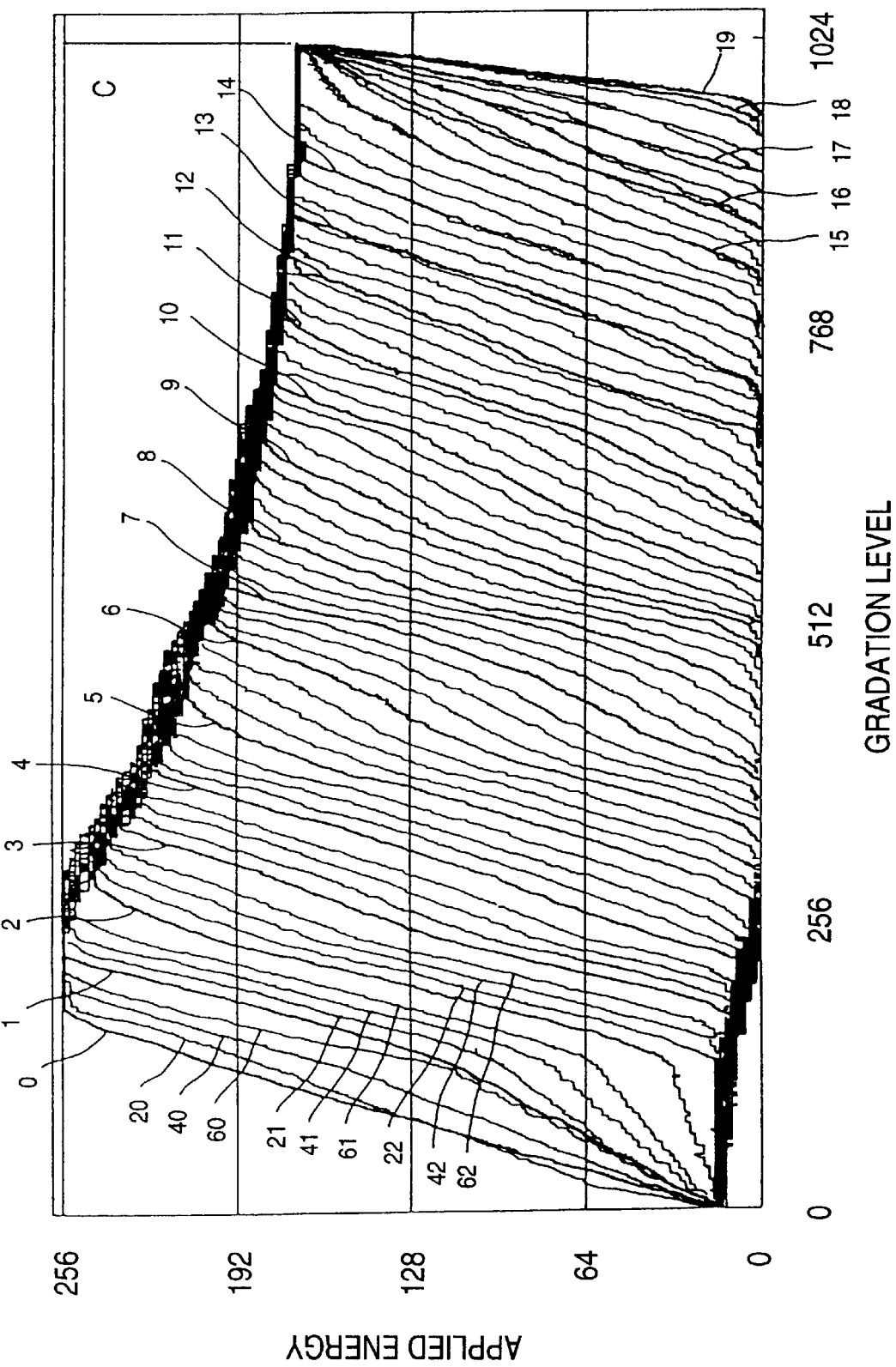
FIG. 5 is a set of characteristic curves for use with a C gradation conversion table that represent the relationship between the gradation level and the amount of energy to be applied to the recording head.
Figure 6:
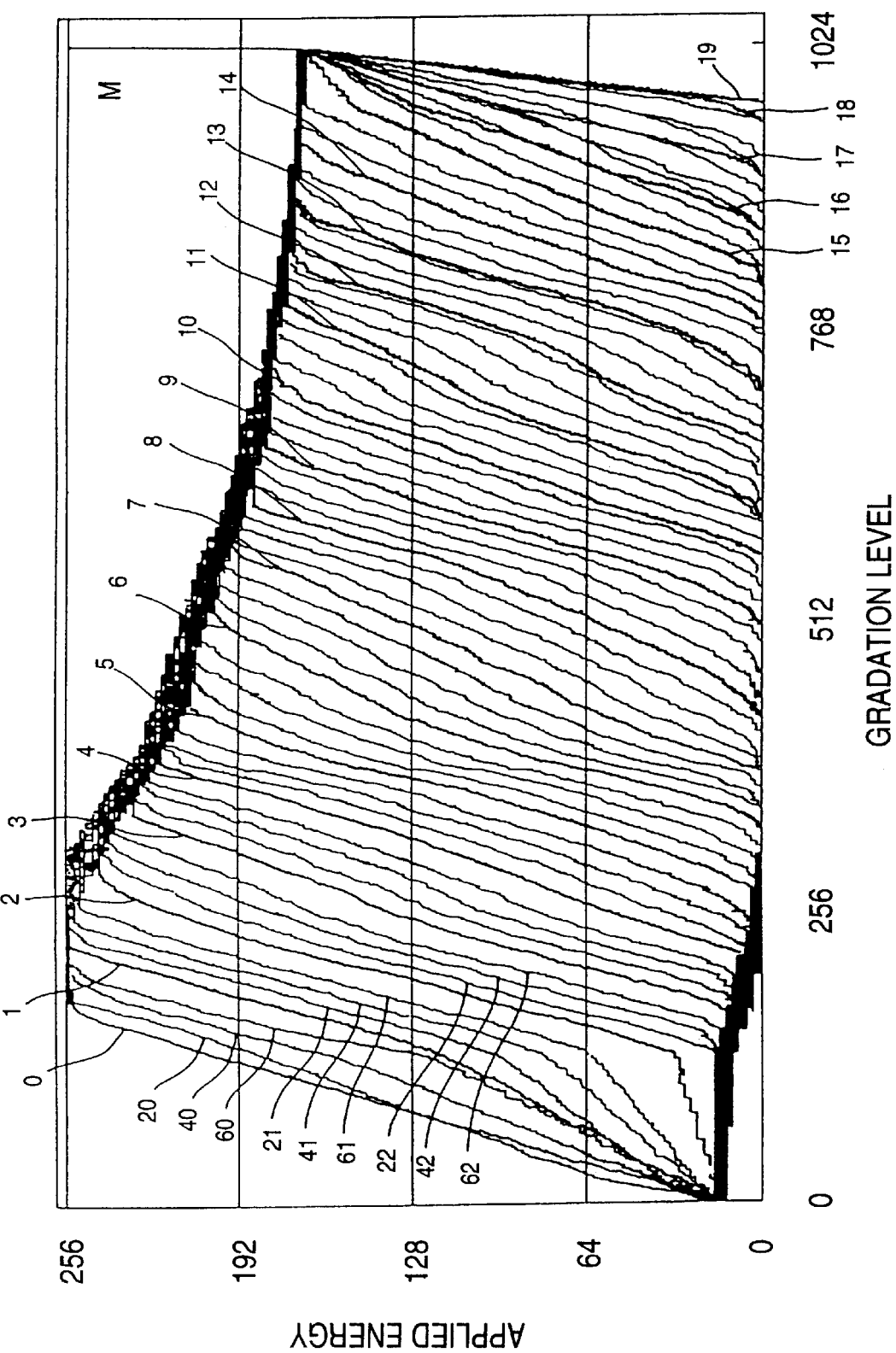
FIG. 6 is a set of characteristic curves for use with an M gradation conversion table that represent the relationship between the gradation level and the amount of energy to be applied to the recording head.
Figure 7:
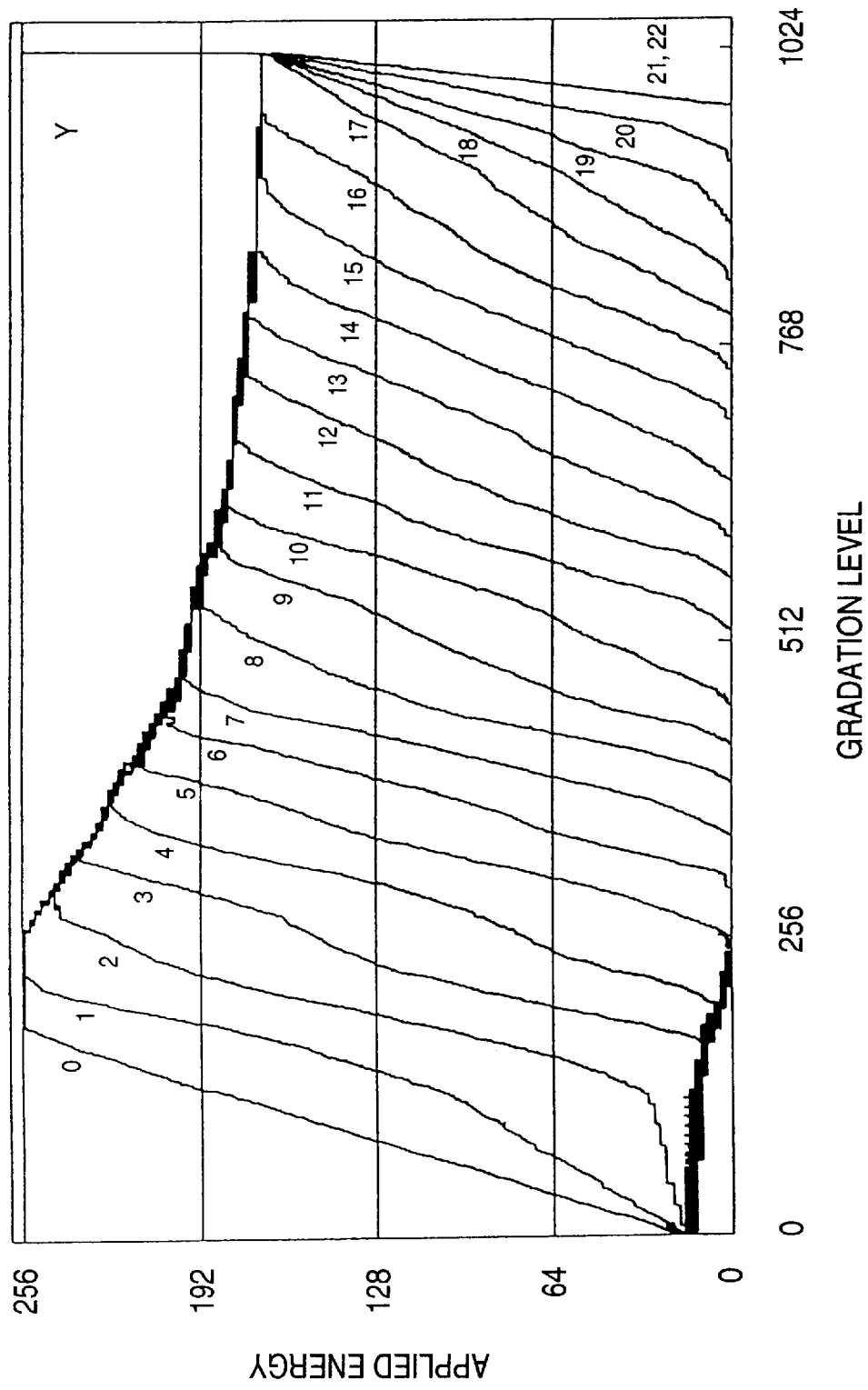
FIG. 7 is a set of characteristic curves for use with a Y gradation conversion table that represent the relationship between the gradation level and the amount of energy to be applied to the recording head.

The gradation conversion characteristics for C, M and Y colors are similarly shown in FIGS. 5–7, respectively.

As shown in FIG. 2, a main scan clock Mclk and a sub-scan clock Sclk each providing pixel position information for the image gradation level data are frequency divided so that the image is divided into blocks of a predetermined size and then the relative positions of pixels in each block are set.

Figure 8:
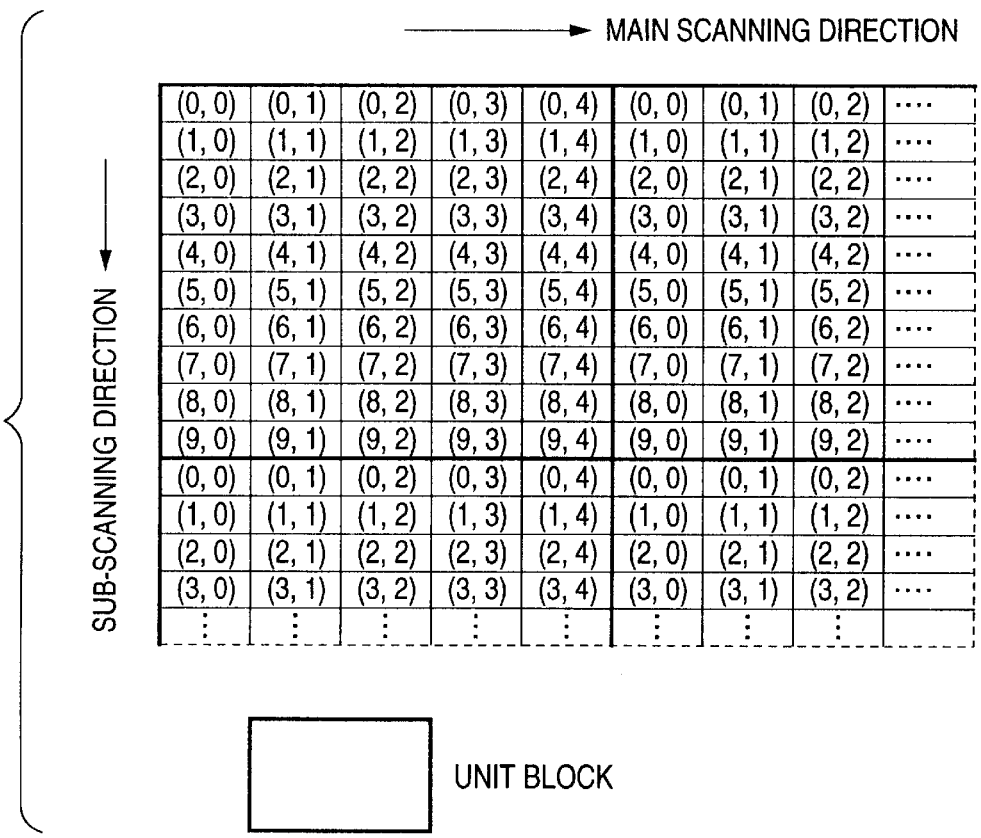
FIG. 8 is the result of establishing relative pixel positions within each block by means of a quinary counter and a decimal counter.

Specifically, in the case of K color, the main scan clock Mclk and the sub-scan clock Sclk are input to a quinary counter 53 and a decimal counter 54, respectively. The quinary counter 53 divides the input value by 5 and outputs the remainder whereas the decimal counter 54 divides the input value by 10 and outputs the remainder. Consequently, as shown in FIG. 8, the image from the image gradation level data is divided into a plurality of unit blocks each sized to 5 dots in the main scan direction and 10 dots in the sub-scan direction and which are set periodically throughout the image and the individual pixels in each unit block are assigned their position information (i,j).

Figure 9:
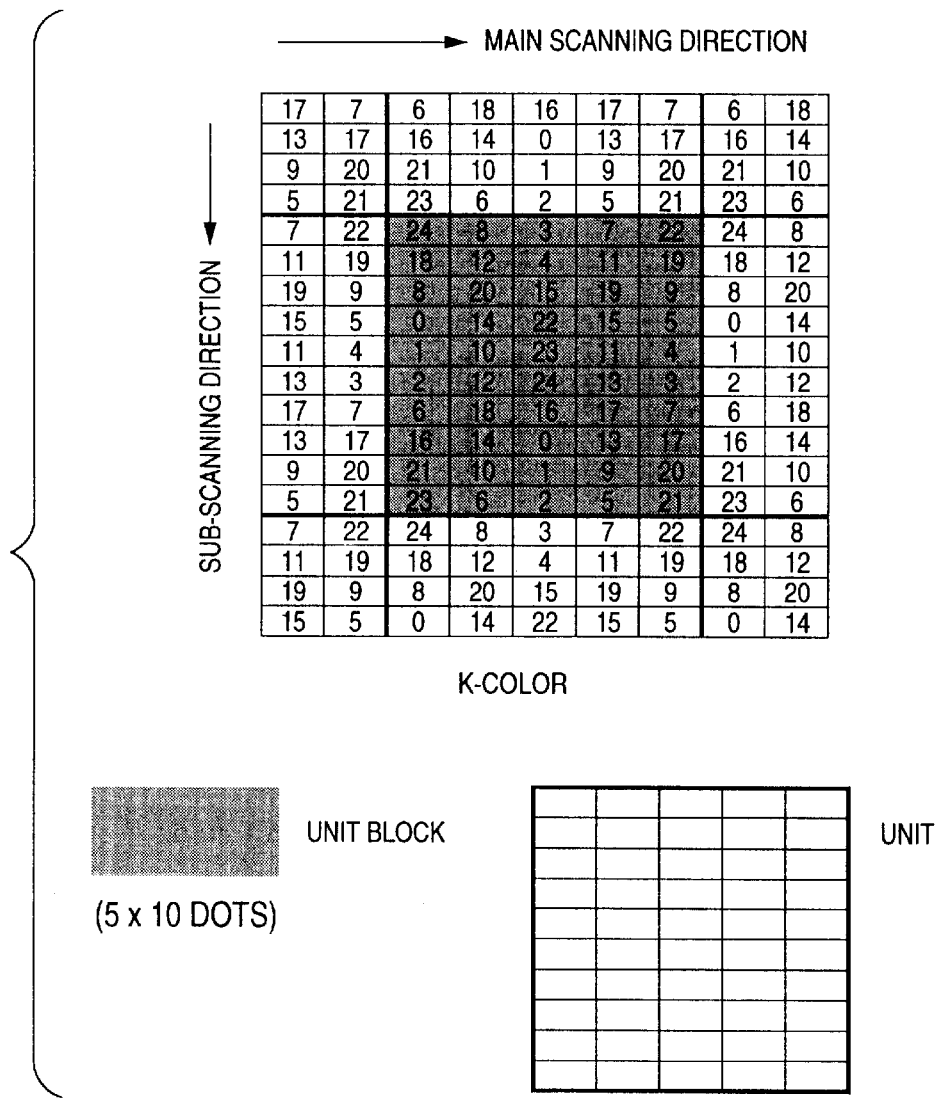
FIG. 9 is a unit block and a "unit" for a K transformation matrix (to give a screen angle of about 45 degrees)

Subsequently, the position information (i,j) in each of the settings of unit blocks is input to a table No. designating section 55 (see FIG. 2) so as to determine which characteristic curve should be used for which of the pixels in the unit block. FIG. 9 shows a K color transformation matrix stored in the table No. designating section 55, where each of the pixel positions in the unit block is assigned the corresponding characteristic curve number. Note that the numbers 0–24 in the transformation matrix shown in FIG. 9 are respectively keyed to the characteristic curves 0–24 shown in FIG. 4.

To state more specifically, the image gradation level data within a unit block that has been set by the quinary counter 53 and the decimal counter 54 are respectively assigned the numbers 0–24 in accordance with the pixel position in the unit block and the recording dots are grown on the basis of the characteristic curve having an assigned number. Take, for example, the image gradation level data (for K color) representing the in-block pixel position (3,0). Referring to the transformation matrix shown in FIG. 9, one can see that the corresponding pixel position is assigned the number "zero". Therefore, he uses the characteristic curve No. 0 shown in FIG. 4 and converts the gradation level of the image gradation level data to the amount of energy to be applied. This process of conversion is repeated over the entire region of the input image gradation level data and the sum of the values of applicable energy that have been determined by conversion from the gradation levels is output to the recording unit 40.

Figure 10:
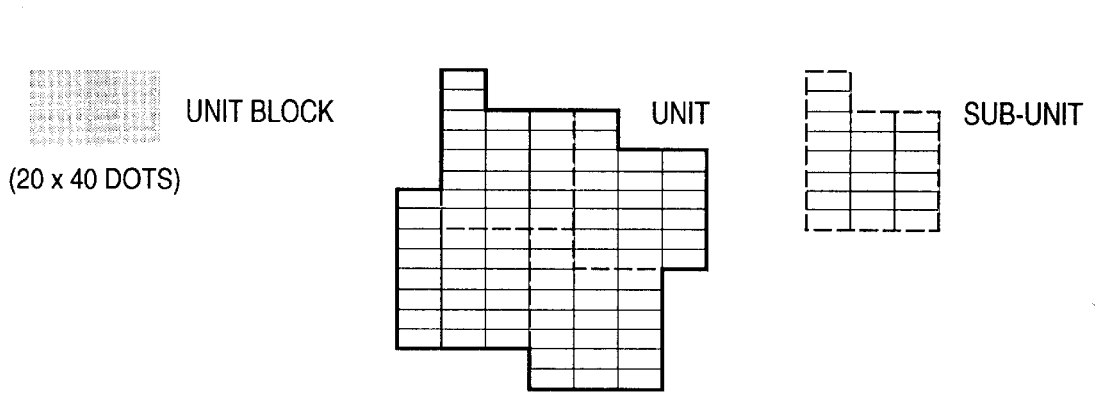
FIG. 10 is a unit block, a "unit" and a subunit for a C transformation matrix (to give a screen angle of about 75 degrees)
Figure 12:
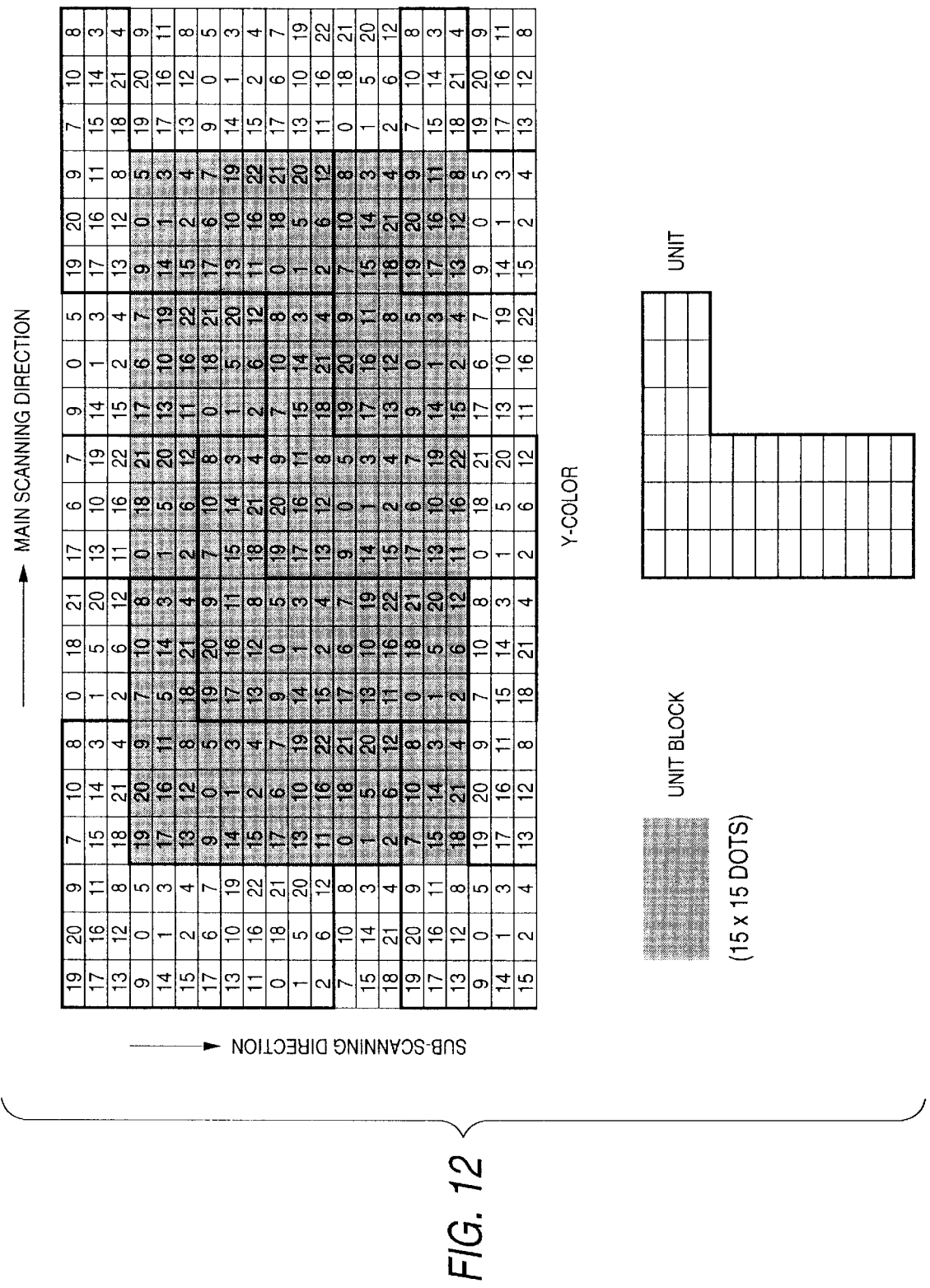
FIG. 12 is a unit block, a "unit" and a subunit for a Y transformation matrix (to give a screen angle of about 30 degrees)

Similarly, transformation matrices designating the numbers of characteristic curves applicable to C, M and Y colors are shown in FIGS. 10–12. For these C, M and Y colors, the above-described procedure for gradation conversion is performed, whereupon the recording data as converted to applicable energy is output to the recording unit 40.

We now describe in detail the transformation matrices for K, C, M and Y colors in this order with reference to FIGS. 9–12. First, the K color matrix shown in FIG. 9 consists of unit blocks one of which is shown lightly shaded to have a size of 5×10 dots, the setting of which is the same as the "unit" to be described below. Each unit block is recorded as a square matrix if the printing resolution for the sub-scan direction is set twice the value for the main scan direction. For the sake of simplicity, assume here that the image gradation levels take certain values of zero and more and that the characteristic curves "0", "1" and "2" shown in FIG. 4 are predominant in contribution to image recording. Then, a pattern of dots 60 are recorded at a predetermined density in the shaded positions in FIG. 13. The screen angle of the pattern (the angle to which the dots are aligned) is about 45 degrees as indicated by straight lines in FIG. 13.

Figure 13:
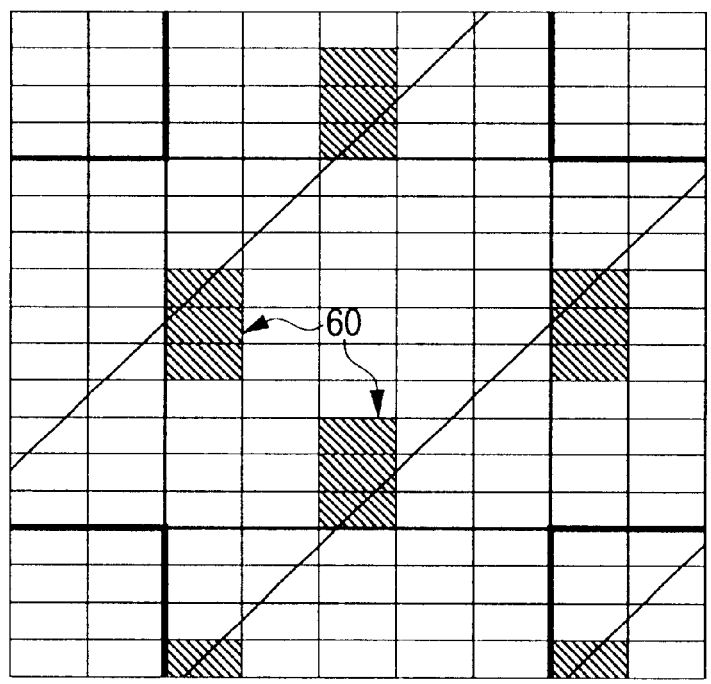
FIG. 13 is an illustration explaining how a pattern of K recording dots are formed (to give a screen angle of about 45 degrees)

This is how the dots in the unit block grow. As FIG. 13 shows, two printing dots 60 are formed simultaneously within the unit block; as they grow further, the dots become larger generally centering at the middle of the four sides of the unit block. Hence, when the dots have grown to a medium tone, there are a total of four recording dots of ½ size within the unit block.

We next describe the C color matrix. The unit block shown lightly shaded in FIG. 10 is of such a size that it consists of 20 dots in the main scan direction and 40 dots in the sub-scan direction. It has a plurality of non-rectangular units each consisting of four subunits.

In other words, the size of a unit cell is the least common multiple of the units which are tiled seamlessly in a plane to provide a two-dimensional periodicity in two crossed directions. Hence, by repeating the arrangement of such unit cells, both the units and the subunits are automatically aligned in an ordered pattern.

If one subunit is set as a single unit, the unit block can be set to a size of 10×10 dots. However, in the embodiment under consideration, each subunit is slightly modified in the internal structure (assignment of characteristic curves) with a view to preventing the occurrence of tone jumps, so four different subunits combine to make one unit. Needless to say, one unit can be made of any number of subunits that depends on the case.

Figure 14:
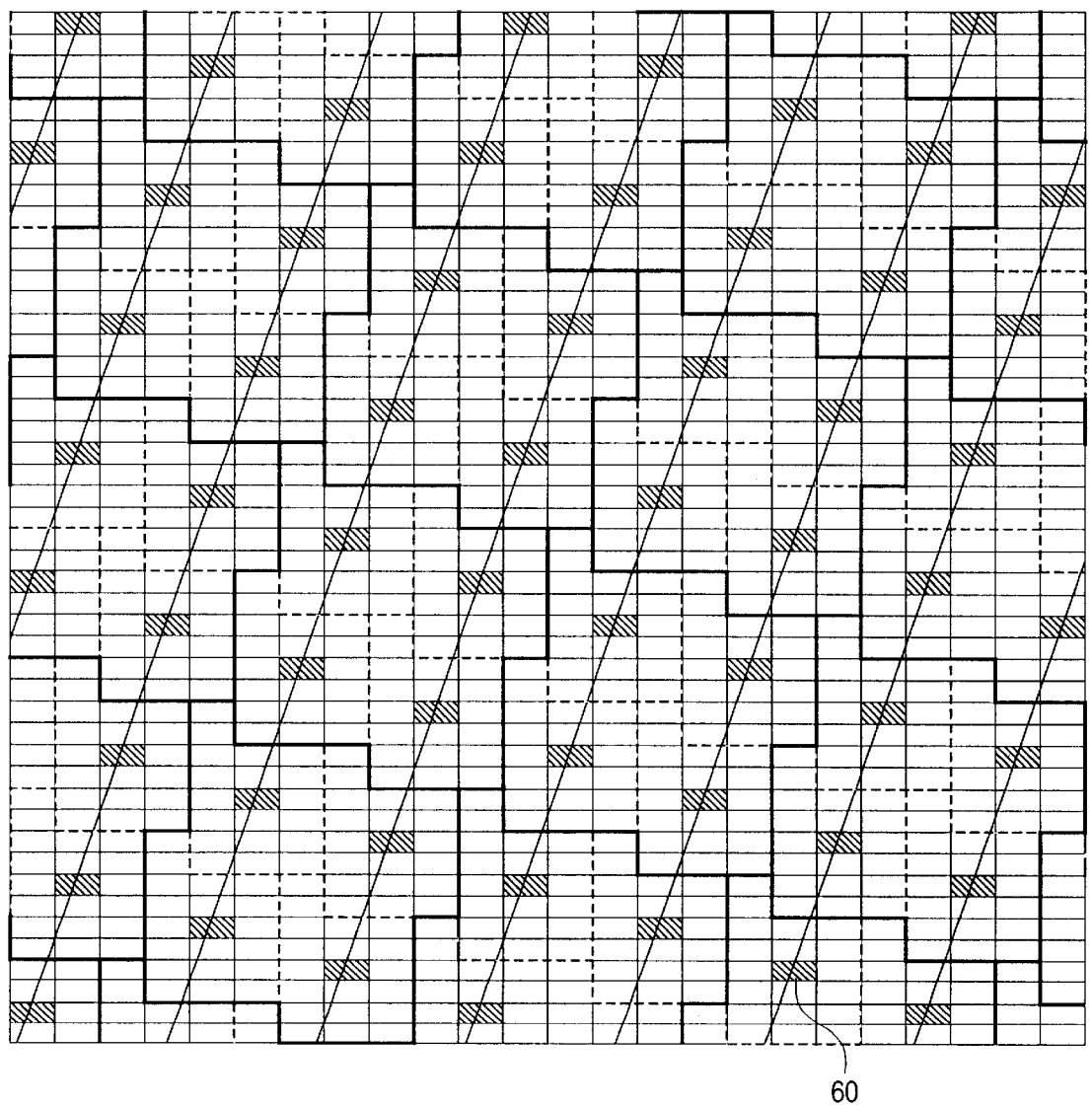
FIG. 14 is an illustration explaining how a pattern of C recording dots are formed (to give a screen angle of about 75 degrees)

Assume here that the characteristic curves "0", "20", "40" and "60" shown in FIG. 5 are predominant in contribution to image recording. Then, a pattern of dots 60 are recorded at a predetermined density in the shaded positions in FIG. 14. The screen angle of the pattern is about 75 degrees as indicated by straight lines in FIG. 14.

The M color transformation matrix shown in FIG. 11 is the same as the C color matrix in that one unit is composed of four subunits and that the least common multiple of such units that are aligned with periodicity provides the unit block which is of such a size that it consists of 20 dots in the main scan direction and 40 dots in the sub-scan direction.

Figure 15:
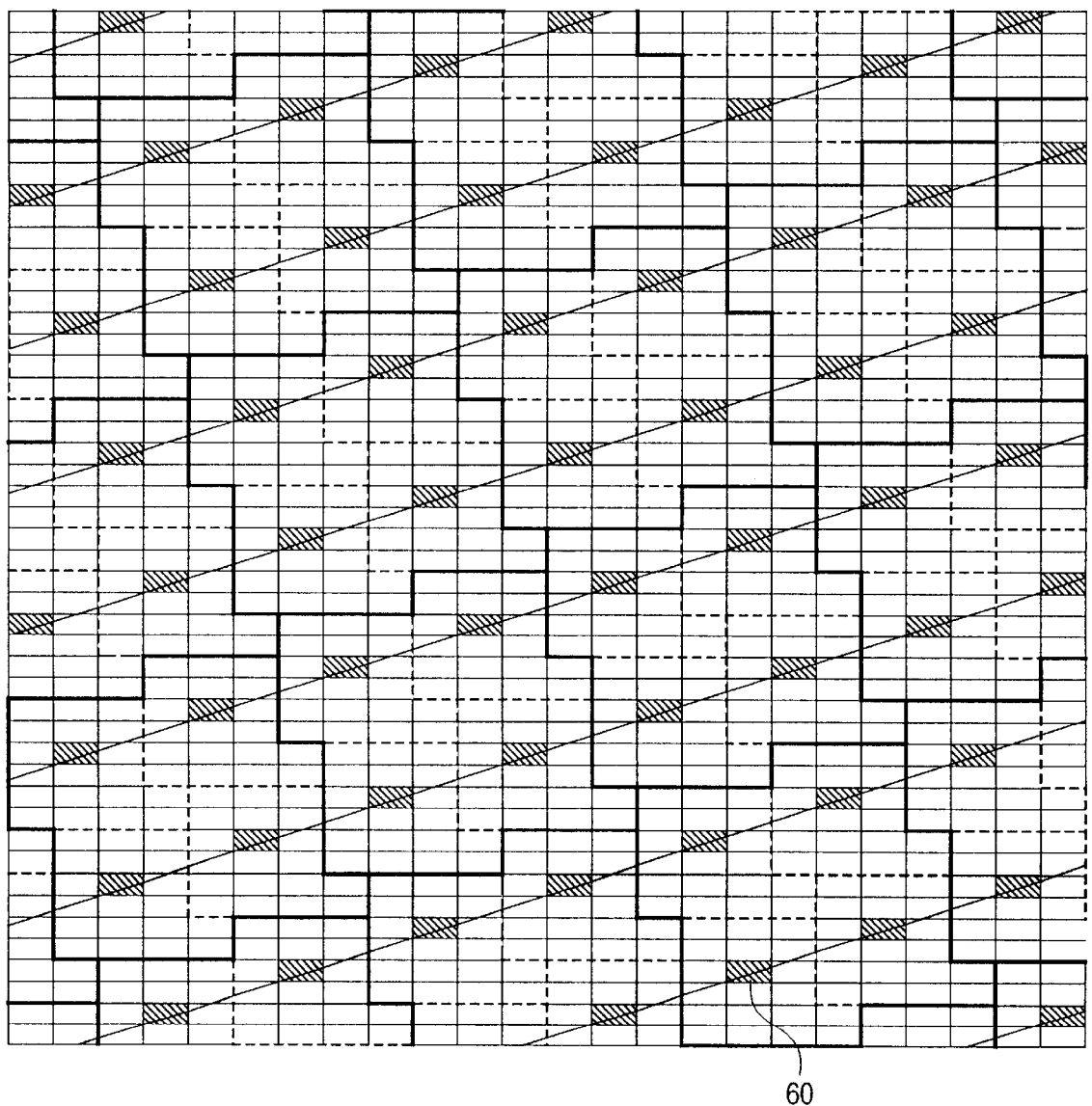
FIG. 15 is an illustration explaining how a pattern of M recording dots are formed (to give a screen angle of about 15 degrees)

Also assume that the characteristic curves "0", "20", "40" and "60" shown in FIG. 6 are predominant in contribution to image recording. Then, a pattern of dots 60 are recorded at a predetermined density in the shaded positions in FIG. 15. The screen angle of the pattern is about 15 degrees.

The Y color transformation matrix shown in FIG. 12 consists of rectangular unit blocks each consisting of 15 dots in both the main scan and sub-scan directions. Each unit block also consists of more than one unit and as in the C and M transformation matrices, the least common multiple of such units that are aligned with periodicity provides the unit block.

Figure 16:
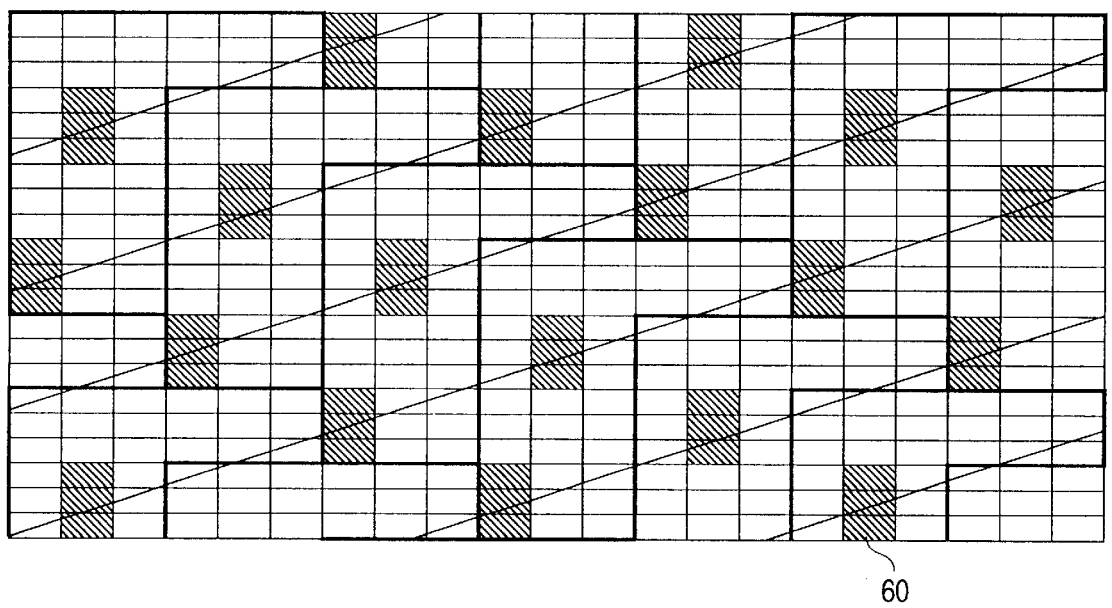
FIG. 16 is an illustration explaining how a pattern of Y recording dots are formed (to give a screen angle of about 30 degrees)

Since the characteristic curves "0", "1" and "2" shown in FIG. 7 contribute to the recording of highlights, a pattern of dots 60 appear as shown in FIG. 16. The screen angle of this pattern is about 30 degrees.

As described on the foregoing pages, the image forming apparatus of the invention processes input image gradation level data for K, C, M and Y colors in such a manner that the amounts of energy to be applied for image recording are set on the basis of the conversion characteristics shown in FIGS. 4–7 in correspondence with the pixel positions keyed to the transformation matrices shown in FIGS. 9–12.

In order to print the image at different screen angles for different colors, the unit blocks must be set to satisfy the following conditions of block size.

Figure 17:
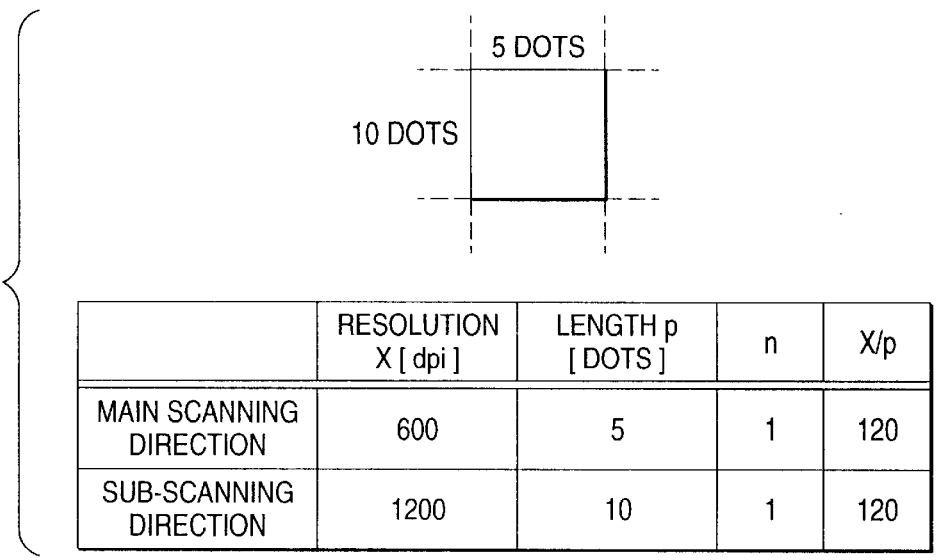
FIG. 17 is an illustration of the conditions that should be satisfied by the size of a unit block in order to provide a screen angle of about 45 degrees.

If a screen angle of 45, degrees is desired, it is required to satisfy:

$$(110/n) < X/p < (130/n) \tag{1}$$

provided p is an integral multiple of 5;
where X is the resolution of the image to be recorded in either the main scan direction or the sub-scan direction and expressed in dpi, p is the length of the unit block in either one of said directions and expressed in dots, and n is a natural number representing the number of subunits in either one of said directions. In the above-described case of K color, the value of X/p is 120 in both the main scan and sub-scan directions and n is 1 (see FIG. 17), so Eq. (1) is obviously satisfied. If this condition is not met, the desired screen angle (45 degrees) cannot be attained.

Figure 18:
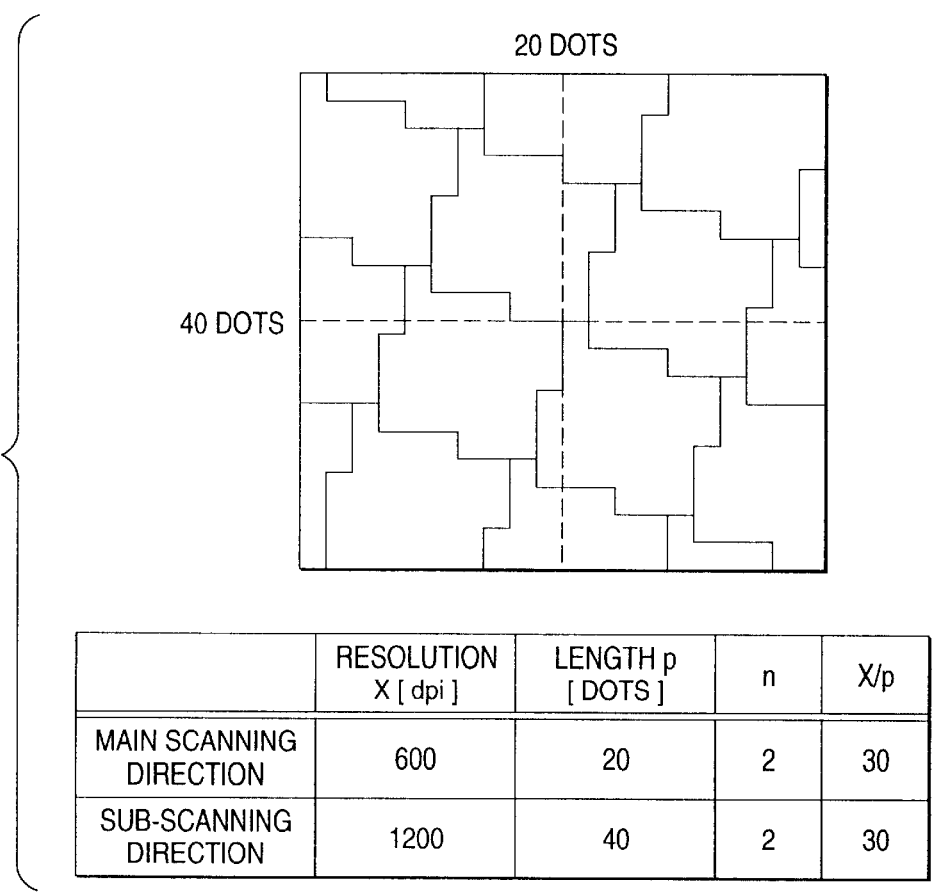
FIG. 18 is an illustration of the conditions that should be satisfied by the size of a unit block in order to provide a screen angle of about 75 degrees.
Figure 19:
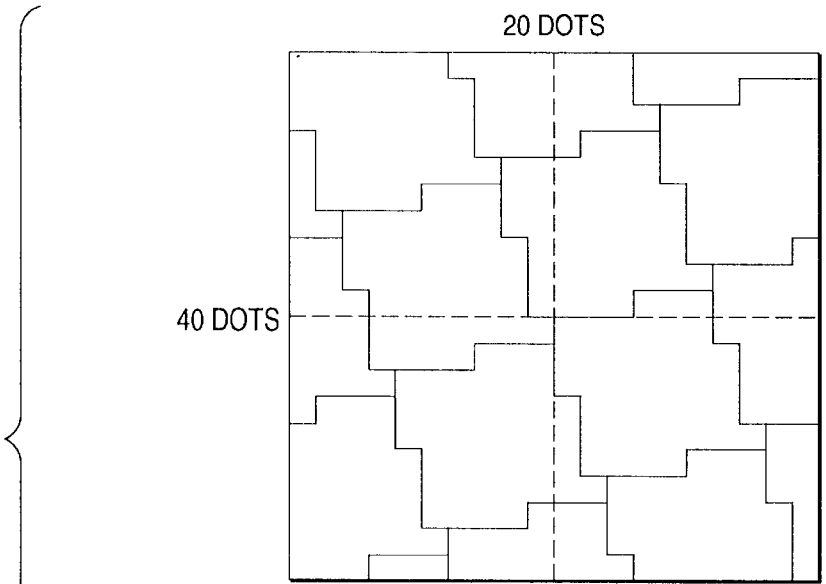
FIG. 19 is an illustration of the conditions that should be satisfied by the size of a unit block in order to provide a screen angle of about 15 degrees.

If screen angles of 15 and 75 degrees are desired, it is required to satisfy:

$$(55/n) < X/p < (65/n) \tag{2}$$

provided p is an integral multiple of 10. In the above-described cases of C and M colors, the value of X/p is 30 in both the main scan and sub-scan directions and n is 2 (see FIGS. 18 and 19) since two subunits are arranged in either one direction; hence, Eq. (2) is satisfied.

Figure 20:
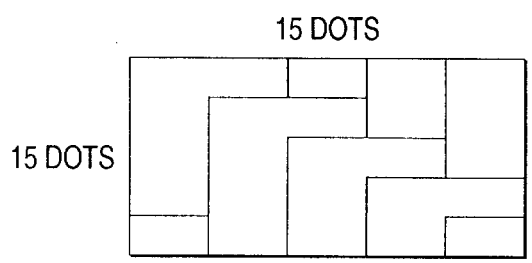
FIG. 20 is an illustration of the conditions that should be satisfied by the size of a unit block in order to provide a screen angle of about 30 degrees.

If a screen angle of 30 degrees is desired, it is required to satisfy the following two equations:

$$(36/n) < X_1/p_1 < (44/n) \tag{3}$$

where $X_1$ is the resolution of the image to be recorded in the main scan direction and expressed in dpi and $p_1$ is the length of the unit block in the main scan direction and expressed in dots; and $$(72/n) < X_2/p_2 < (88/n) \tag{4}$$

provided $p_1$ and $p_2$ are each an integral multiple of 15;
where $X_2$ is the resolution of the image to be recorded in the sub-scan direction and expressed in dpi and $p_2$ is the length of the unit block in the sub-scan direction and expressed in dots. In the above-described case of Y color, the value of X/p is 40 in the main scan direction and 80 in the sub-scan direction and n is 1 (see FIG. 20); hence, Eqs. (3) and (4) are both satisfied.

By thusly setting unit blocks that satisfy Eqs. (1)–(4), recording dot patterns of the desired screen angles can be provided for any image resolution and the image can be recorded to have quality very much like the quality of printed matter.

Variants of the foregoing embodiment are described below. Screen angles for K, C, M and Y colors are generally determined at certain values and the color and screen angle correspondences described in the foregoing embodiment may be modified as appropriate. As shown in Table 1 below, the combinations of screen angles with K, C, M and Y colors described in the foregoing embodiment are modified and set forth as variants of the embodiment.

Example 1 is equivalent to the foregoing embodiment; Example 2 is the same as Example 1 except that the screen angle for color Y is changed to zero degrees; Example 3 is the same as Example 1 except that the screen angle for K and C colors is changed to 15 or 75 degrees and that for M color is changed to 45 degrees; and Example 4 is the same as Example 3 except that the screen angle for Y color is changed to zero degrees. Other combinations may of course be adopted.

TABLE 1

|  | K | C | M | T |
| --- | --- | --- | --- | --- |
| Example 1 | 45° | 15°(75°) | 15°(75°) | 30° |
| Example 2 | 45° | 15°(75°) | 15°(75°) | 0° |
| Example 3 | 15°(75°) | 15°(75°) | 45° | 30° |
| Example 4 | 15°(75°) | 15°(75°) | 45° | 0° |

Figure 21:
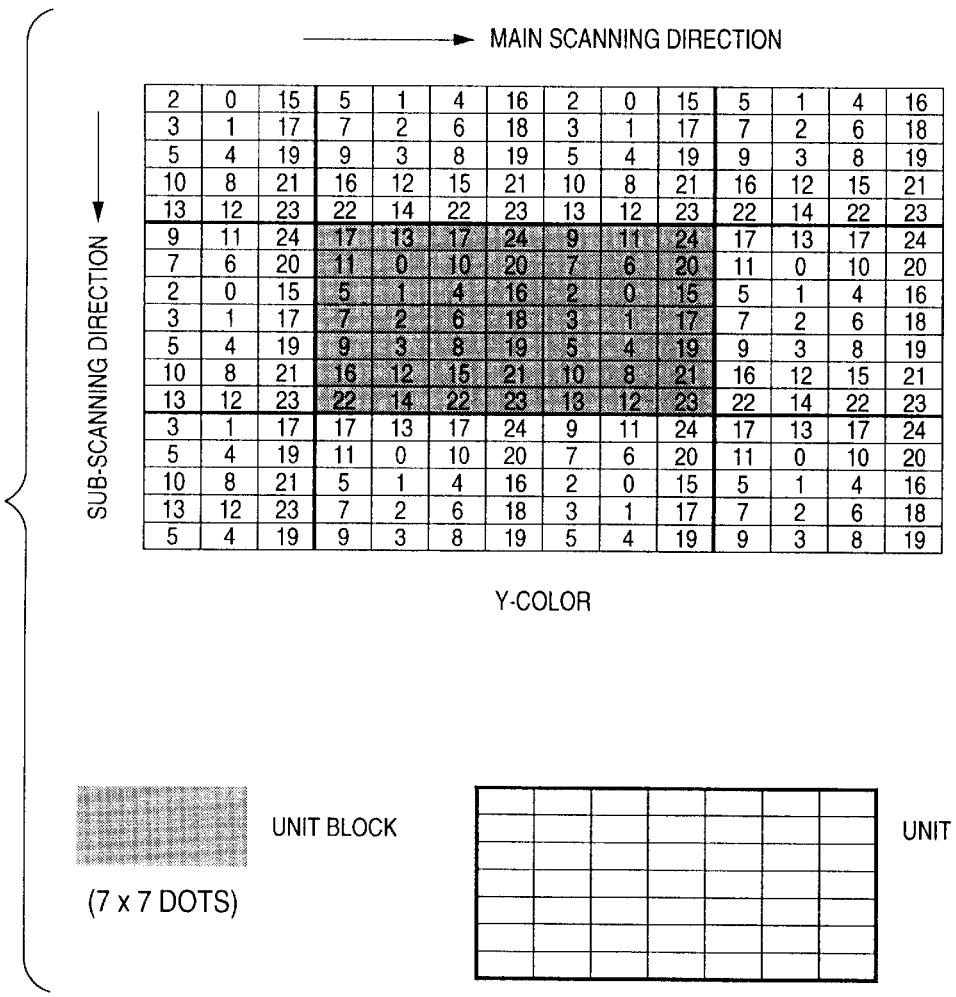
FIG. 21 is a unit block and a "unit" for a Y transformation matrix (to give a screen angle of zero degrees)

A transformation matrix that provides a Y screen angle of zero degrees is shown in FIG. 21. The matrix is set to have unit blocks each consisting of 7 dots in both the main scan and sub-scan directions, with the "unit" being also set to the same size. If it is assumed that the characteristic curves "0", "1" and "2" associated with this matrix are predominant in contribution to image recording, a pattern of dots are formed as shown in FIG. 22 to provide a screen angle of zero degrees.

As is clear from FIG. 22, two dots are first formed simultaneously in each unit (unit block) and they subsequently grow bigger as separate entities In order to provide the Y screen angle of zero degrees, the size of the unit block must satisfy the following equations:

$$(77/n) < X_1/p_1 < (94/n) \tag{5}$$

where $X_1$ is the resolution of the image to be recorded in the main scan direction and expressed in dpi and $p_1$ is the length of the unit block in the main scan direction and expressed in dots; and $$(154/n) < X_2/p_2 < (189/n) \tag{6}$$

provided $p_1$ and $p_2$ are each an integral multiple of 7;
where $X_2$ is the resolution of the image to be recorded in the sub-scan direction and expressed in dpi and $p_2$ is the length of the unit block in the sub-scan direction and expressed in dots. In the above-described case of Y color, the value of X/p is 85.7 in the main scan direction and 171.4 in the sub-scan direction and n is 1 (see FIG. 23); hence, Eqs. (5) and (6) are both satisfied.

EXAMPLES

Using the image forming apparatus of the invention, image was recorded with gradation conversion being effected under the conditions set forth above for Examples 1–4 and the quality of the recorded image was evaluated. Other test conditions were as follows.

a. Recording Head
   pitch between heat generating resistors: 600 dpi
   resistor size: 35 μm in main scan direction and 40 μm in sub-scan direction
   number of resistors: 7296
   resistance: 4000Ω on average
b. Recording Material
   ink ribbon: Proof ribbon J for FirstProof, a digital color proof of Fuji Photo Film Co., Ltd.
   receiver sheet: Receiver sheet for FirstProof, a digital color proof of Fuji Photo Film Co., Ltd.
c. Recording Conditions
   Recording resolution: 600 dpi in main scan direction 1200 dpi in sub-scan direction The recording material used in the test was a heat-sensitive transfer recording material having a substantially clear heat-sensitive ink layer in a thickness of from 0.2 μm to 1.0 μm and containing 30–70 parts by weight of a pigment and 25–60 parts by weight of an amorphous organic high-molecular weight polymer having a softening point of 40° C.–150° C., at least 70% of the pigment in said heat-sensitive ink layer having a particle size of no more than 1.0 μm, and the transfer image having an optical reflection density of at least 1.0 on a white base.

When the image gradation level data for respective colors K, C, M and Y were recorded under the conditions set forth above, the resulting image was satisfactory in all examples (the preferred embodiment and its three variants), demonstrating that high-quality multi-level image could conveniently be produced by the image forming apparatus of the invention.

It should be noted that the image forming method implemented by the image forming apparatus of the invention is also applicable with equal advantageous results to thermal printers using the LOUVER method or the VDS method, printers using a dithered VR screen, laser beam recording apparatus and ink-jet recording apparatus.

What is claimed is:

1. An image forming apparatus which divides input image gradation level data into a plurality of blocks in which gradation recording is performed by converting said divided image gradation level data into multi-level recording data in accordance with gradation conversion characteristics determined by relative positions in each of said blocks, wherein:
   said blocks are set to a size with being defined by $(55/n)<X/p<(65/n)$, said p is an integral multiple of 10; said X is a resolution of a recording image in a given direction, expressed as dpi; said p is a length of each block in said given direction, expressed as dots; and said n is a natural number.

2. An image forming apparatus which divides input image gradation level data into a plurality of blocks in which gradation recording is performed by converting said divided image gradation level data into multi-level recording data in accordance with gradation conversion characteristics determined by relative positions in each of said blocks, wherein:
   said blocks are set to a size with being defined by $(110/n)<X/p<(130/n)$, said p is an integral multiple of 5; said X is a resolution of a recording image in a given direction, expressed as dpi, said p is a length of each block in said given direction, expressed as dots; and said n is a natural number.

3. An image forming apparatus which divides input image gradation level data into a plurality of blocks in which gradation recording is performed by converting said divided image gradation level data into multi-level recording data in accordance with gradation conversion characteristics determined by relative positions in each of said blocks, wherein:
   said blocks are set to a size with being defined by $(36/n)<X_1/p_1<(44/n)$ and $(72/n)<X_2/p_2<(88/n)$, said $p_1$ and said $p_2$ are both integral multiples of 15; said $X_1$ is a resolution of a recording image in a given direction, expressed as dpi; said $p_1$ is a length of each block in said given direction, expressed as dots; said $X_2$ is a resolution of the recording image in a direction substantially perpendicular to said given direction, expressed as dpi; said $p_2$ is a length of each block in said perpendicular direction, expressed as dots; and said n is a natural number.

4. An image forming apparatus which divides input image gradation level data into a plurality of blocks in which gradation recording is performed by converting said divided image gradation level data into multi-level recording data in accordance with gradation conversion characteristics determined by relative positions in each of said blocks, wherein:
   said blocks are set to a size with being defined by $(77/n)<X_1/p_1<(94/n)$ and $(154/n)<X_2/p_2<(189/n)$, said $p_1$ and said $p_2$ are both integral multiples of 7; said $X_1$ is a resolution of a recording image in a given direction, expressed as dpi, said $p_1$ is a length of each block in said given direction, expressed as dots, said $X_2$ is a resolution of the recording image in a direction substantially perpendicular to said given direction, expressed as dpi, said $p_2$ is a length of each block in said perpendicular direction, expressed as dots; and said n is a natural number.

5. The image forming apparatus according to any one of claim 1, 2 or 3, wherein the blocks correspond to the respective colors in which a multi-color image is to be recorded.

6. The image forming apparatus according to any one of claim 1, 2 or 4, wherein the blocks correspond to the respective colors in which a multi-color image is to be recorded.

7. The image forming apparatus according to any one of claim 1, 2 or 3, wherein the blocks set forth in claim 1 are dedicated to recording in cyan and magenta, the blocks set forth in claim 2 to recording in black, and the blocks set forth in claim 3 to recording in yellow.

8. The image forming apparatus according to any one of claim 1, 2 or 4, wherein the blocks set forth in claim 1 are dedicated to recording in cyan and magenta, the blocks set forth in claim 2 to recording in black, and the blocks set forth in claim 4 to recording in yellow.

9. The image forming apparatus according to any one of claim 1, 2 or 3, wherein the blocks set forth in claim 1 are dedicated to recording in cyan and black, the blocks set forth in claim 2 to recording in magenta, and the blocks set forth in claim 3 to recording in a yellow.

10. The image forming apparatus according to any one of claim 1, 2 or 4, wherein the blocks set forth in claim 1 are dedicated to recording in cyan and black, the blocks set forth in claim 2 to recording in magenta, and the blocks set forth in claim 4 to recording in yellow.

11. The image forming apparatus according to any one of claims 1–10, wherein a recording head for performing said graduated recording is a thermal head.

12. The image forming apparatus according to any one of claims 1–11, which uses a heat-sensitive transfer recording material that has a substantially clear heat-sensitive ink layer in a thickness of from 0.2 μm to 1.0 μm and containing 30–70 parts by weight of a pigment and 25–60 parts by weight of an amorphous organic high-molecular weight polymer having a softening point of 40° C.–150° C., at least 70% of the pigment in said heat-sensitive ink layer having a particle size of no more than 1.0 μm, and the transfer image having an optical reflection density of at least 1.0 on a white base.

* * * * *